(12) United States Patent
Amit

(10) Patent No.: US 7,197,045 B2
(45) Date of Patent: Mar. 27, 2007

(54) CMTS ARCHITECTURE BASED ON ETHERNET INTERFACE LOCATABLE IN A FIBER NODE

(75) Inventor: Mati Amit, Zur-Yigal (IL)

(73) Assignee: Texas Instruments Incorporated, Dallas, TX (US)

( * ) Notice: Subject to any disclaimer, the term of this patent is extended or adjusted under 35 U.S.C. 154(b) by 1166 days.

(21) Appl. No.: 09/761,557

(22) Filed: Jan. 16, 2001

(65) Prior Publication Data

US 2002/0093970 A1    Jul. 18, 2002

(51) Int. Cl.
*H04L 12/413* (2006.01)
(52) U.S. Cl. ............... 370/445; 370/463; 370/469
(58) Field of Classification Search ............ 370/469, 370/445, 466, 352, 386, 400, 403, 463, 486; 725/111, 95–96; 375/222
See application file for complete search history.

(56) References Cited

U.S. PATENT DOCUMENTS

| | | | | |
|---|---|---|---|---|
| 5,892,768 A | * | 4/1999 | Jeng | 370/445 |
| 5,953,345 A | * | 9/1999 | Findlater et al. | 370/446 |
| 6,490,727 B1 | * | 12/2002 | Nazarathy et al. | 725/129 |
| 6,567,195 B1 | * | 5/2003 | Ford et al. | 398/58 |
| 6,574,240 B1 | * | 6/2003 | Tzeng | 370/469 |
| 6,697,379 B1 | * | 2/2004 | Jacquet et al. | 370/469 |
| 6,847,644 B1 | * | 1/2005 | Jha | 370/392 |
| 2001/0049740 A1 | * | 12/2001 | Karpoff | 709/231 |

OTHER PUBLICATIONS

U.S. Appl. No. 60/191,273.*
Oleh Sniezko, et al., HFC architecture in the making-Future-proofing the network, CED Communications Engineering & Design (Jul. 1999), www.cedmagazine.com.
Oleh Sniezko, et al., HFC architecture in the making-Future-proofing the network, CED Communications Engineering & Design (Jul. 1999), (part II), www.cedmagazine.com.

* cited by examiner

*Primary Examiner*—Ricky Q. Ngo
*Assistant Examiner*—Richard Chang
(74) *Attorney, Agent, or Firm*—Steven A. Shaw; W. James Brady; Frederick J. Telecky, Jr.

(57) ABSTRACT

A communication device (116, 216, 316, 416) for a communications network having a first integrated circuit (IC) (141, 244, 344, 444) including one or more receivers (136, 236, 336) and a first MAC function (140, 240, 340), and a second IC (139, 242, 342, 442) including one or more transmitters (134, 234, 334) and a second MAC function (138, 238, 338). The first (141, 244, 344, 444) and second (139, 242, 342, 442) IC's are coupleable to a communications network for controlling the downstream and upstream communications, respectively.

21 Claims, 3 Drawing Sheets

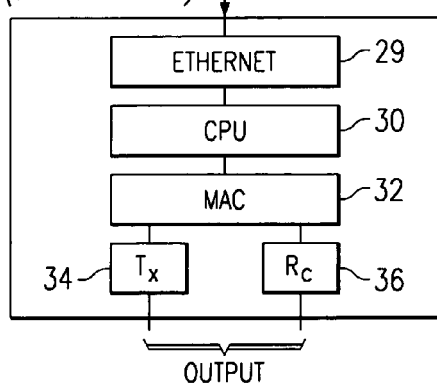
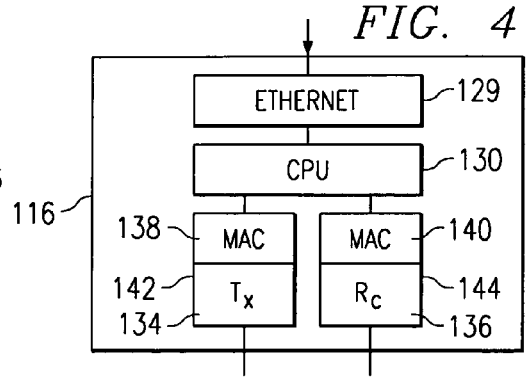
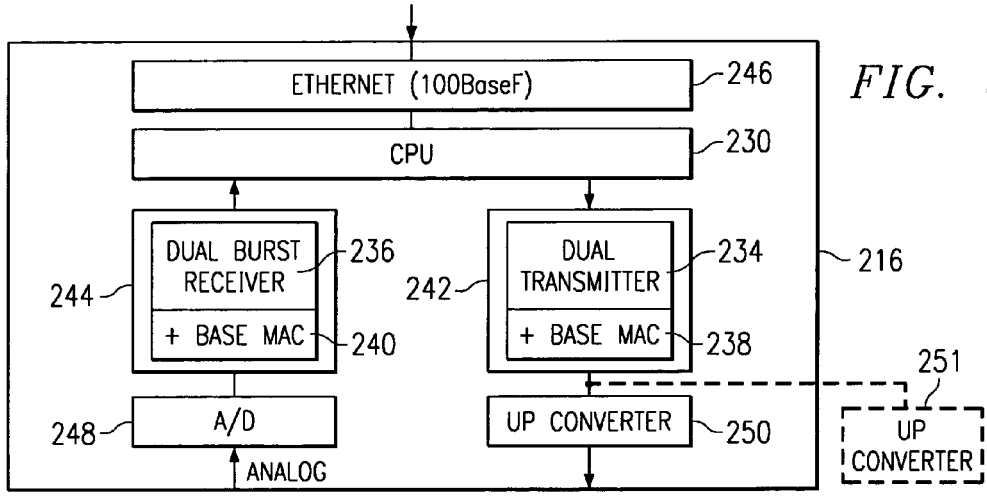
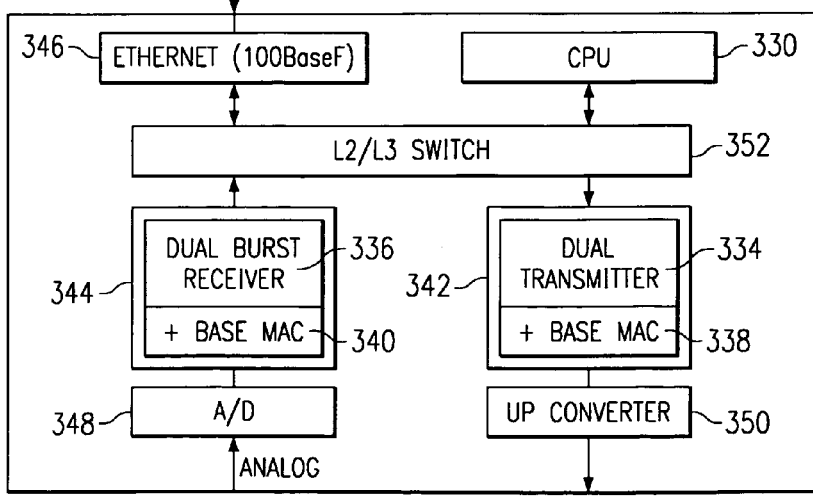

CMTS ARCHITECTURE BASED ON ETHERNET INTERFACE LOCATABLE IN A FIBER NODE

TECHNICAL FIELD

This invention relates generally to communications networks, and more particularly to a design for a communications device such as a fiber node or headend.

BACKGROUND OF THE INVENTION

Cable modems are being deployed today that allow high-speed Internet access in the home over a cable network, often referred to as a hybrid fiber copper (HFC) cable network. A functional block diagram of a cable modem 12 in use in a cable network 10 is shown in FIG. 1. Cable modems (CM) 12 are units, often referred to as consumer premise equipment (CPE), that are connected to a personal computer (PC) or other computing device, for example. A cable modem 12 is adapted to communicate with the cable modem termination system (CMTS) that is typically located at a cable network provider's headend 14. The cable modem 12 typically includes some networking layers, a physical (PHY) layer (modulator/demodulator), a Media Access Control (MAC) (e.g. a Data Over Cable System Interface Specification (DOCSIS) MAC), and it may include upper networking layers. The CM is used to receive Internet traffic or information, data, and telephony. All of the information to the CM is transferred through the CMTS. Using a cable modem 12 over a cable network 10 provides a much faster connection, being at least 10 times faster than a 56K modem, for example.

A cable modem 12 performs modulation and demodulation and the operations necessary to interface with a PC. A cable modem 12 typically comprises a transmitter for upstream modulation of a data signal, usually in short bursts, to a receiver in the headend 14 that serves as an upstream demodulator. The upstream direction refers to sending a data signal from the user at the cable modem 12 towards the headend 14. The upstream signal typically comprises Internet data request information or Voice Over IP telephony, for example, and may be a QPSK/16-QAM at 10 Mbit/s. Cable modem 12 also comprises a receiver for downstream demodulation of signals received from a transmitter in the headend 14 that serves as a downstream modulator. The downstream direction refers to sending a data signal from the headend 14 to the cable modem 12. The downstream modulation/demodulation may be 64-QAM/256 QAM at 27–56 Mbit/s, for example. Both the cable modem 12 and headend 14 include MACs, not shown, that control the media access control (MAC) sublayer of the communication network.

A recent development in cable TV network is the addition of a fiber node 16 coupled between the central office headend 14 and the cable modems 12 in users' homes, as shown in FIG. 1. The fiber node 16 may comprise a fiber node such as AT&T's mini fiber node (mFN) and may be adapted to service around fifty homes or users. A fiber node 16 increases network capacity and reliability, and reduces operating costs, by reducing active components on the final coaxial run to the home.

FIG. 2 shows a more detailed block diagram of a typical architecture of a cable network 10. The national Internet backbone 18 is coupled to the central office headend 14. Headend (HE) 14 is coupled to primary hubs (PH) 20 configured in a primary ring arrangement. Each primary hub 20 is coupled to a plurality of secondary hubs (SH) 22, each secondary hub 22 adapted to service a plurality of households, e.g., 20,000 household passed (HHP). Secondary hubs 22 are coupled to a plurality of mux nodes (M×N) 24, with each mux node 24 adapted to service a plurality of households, e.g., 500 HHP. Each mux node 24 is coupled to a fiber node 16 that may have a backup, with each fiber node 16 adapted to service 50 HHP, for example. Each fiber node (FN) 16 is coupled to and provides cable service to a plurality of cable modems (CM) 12.

The communications over network 10 typically are in accordance with an Internet protocol (IP)/Ethernet standard. The communications from fiber nodes 16 to cable modems 12 is typically in accordance to DOCSIS standard via coax cables. To simplify the fiber node 16 complexity, some of the functionality of the DOCSIS control may be transferred to the secondary hub 22. The connection between the headend 14 through to the fiber nodes 16 is typically via fiber using, for example, Native IP over fiber, IP over Sonet, or IP over SDH.

The present invention relates to a novel design and architecture of a cable network communications device.

SUMMARY OF THE INVENTION

The present invention achieves technical advantages as a communications device such as a headend or a fiber node having a DOCSIS media access control (MAC) split function, with a portion of the MAC function being coupled to a transmitter and a portion of the MAC function coupled to a receiver.

Disclosed is a communication device for a cable communications network, the communication device comprising a first IC including one or more receivers and a first MAC function, and a second IC including one or more transmitters and a second MAC function, wherein the first and second IC's are coupleable to a communications network for controlling the downstream and upstream communications, respectively.

Also disclosed is a communication device comprising a fiber interface, an L2/L3 switch coupled to the fiber interface, a CPU coupled to the L2/L3 switch, one or more transmitters coupled to the L2/L3 switch, and one or more receivers coupled to the L2/L3 switch.

Further disclosed is a method of controlling the receipt and transmission of data in a communications network, comprising receiving data signals and controlling the receipt thereof with a first MAC function, and transmitting data signals and controlling the receipt thereof with a second MAC function, wherein the first and second MAC functions reside in two separate ICs.

Advantages of the invention include reducing costs of a fiber node or headend by providing flexibility in capacity levels with two MAC IC's, rather than providing the maximum capacity level as in single MAC ICs of the prior art. Data packets are transmitted directly over an Ethernet connection rather than being transmitted through a central processing unit (CPU) as in the prior art, which can delay the system. A further advantage is providing more modularity to the fiber node or headend. Another advantage is separating the MAC control of video on demand (VOD) from DOCSIS signals to enable transmission of them at the same time. The CPU can be remote rather than being a part of the fiber node.

BRIEF DESCRIPTION OF THE DRAWINGS

The above features of the present invention will be more clearly understood from consideration of the following descriptions in connection with accompanying drawings in which:

FIG. 3 is a prior art drawing showing a typical fiber node architecture having a single MAC servicing the transmitter and receiver;

FIG. 4 shows a block diagram of the fiber node architecture of the present invention having a split MAC function, with a separate MAC function for the transmitter and a separate MAC function for the receiver;

FIG. 5 shows an embodiment of the present invention having a dual burst receiver and a dual transmitter, each with a separate MAC function;

FIG. 6 shows an alternate embodiment of the present invention including a Level 2 (L2) switch and a CPU that may be remote;

Corresponding numerals and symbols in the different figures refer to corresponding parts unless otherwise indicated.

DETAILED DESCRIPTION OF PREFERRED EMBODIMENTS

Figure 1:
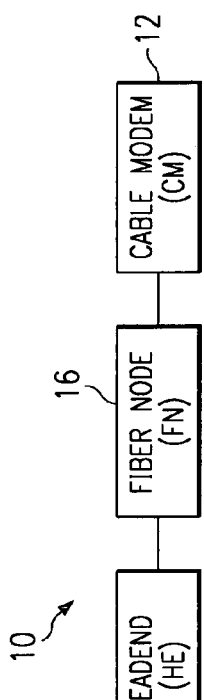
FIG. 1 illustrates a prior art cable modem and central office headend in a simplified view.
Figure 2:
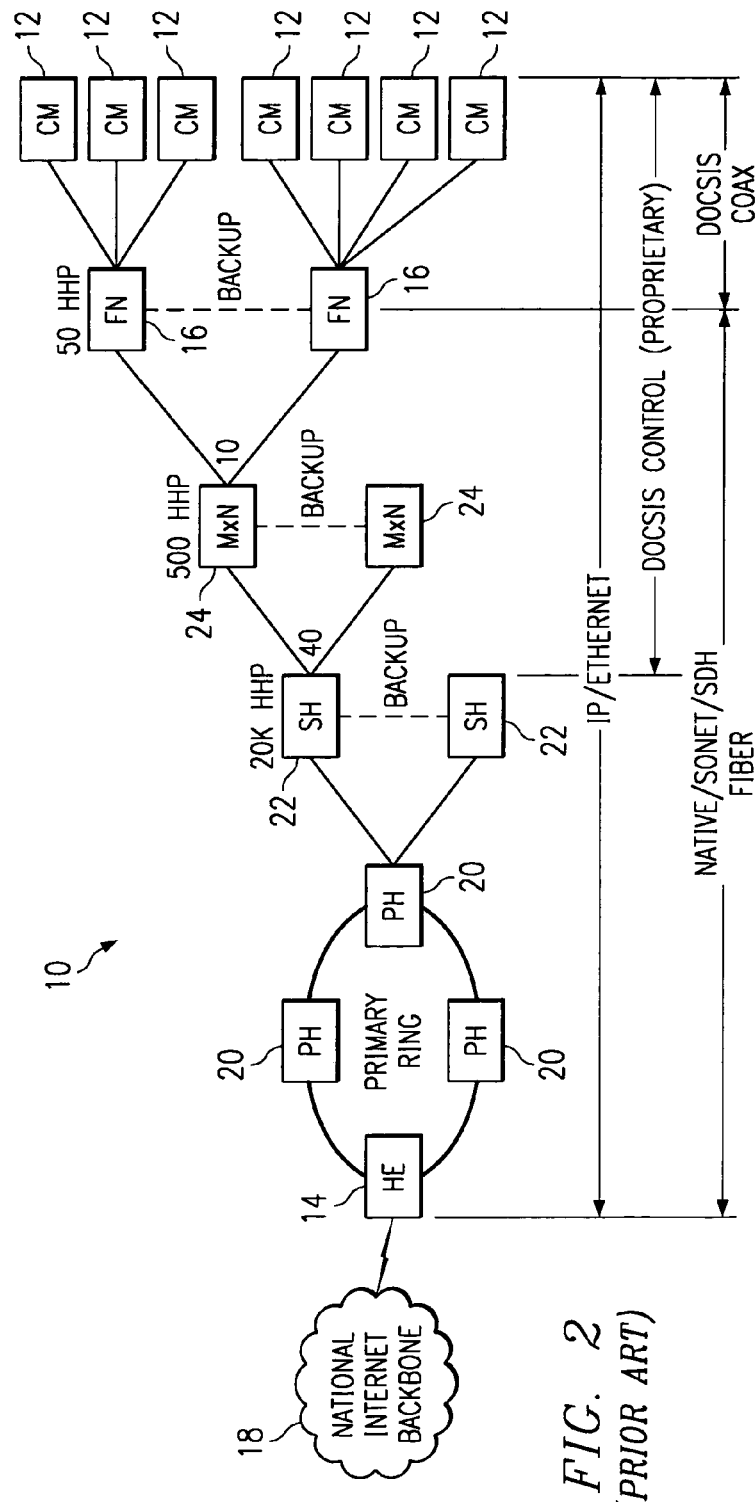
FIG. 2 shows a prior art cable network having a satellite receiver coupled to a headend which is coupled to the rest of the cable network.

FIG. 3 illustrates a prior art CMTS architecture. The CMTS communication device may be located in a headend 14, primary hub (PH) 20, secondary hub (SH) 22, and fiber node (FN) 16, as examples. An Ethernet connection 29 is coupled to a central processing unit (CPU) 30. CPU 30 is coupled to MAC 32. MAC 32 typically comprises a single IC. The MAC 32 functionality is described in the DOCSIS standard document. The main functionalities of the MAC 32 are managing the cable modem, allocating the upstream channel to the cable modems in accordance to a scheduling mechanism, encrypting and decrypting the data, performing ranging to calibrate transmitter levels and to perform ranging to calibrate time references. MAC 32 is coupled to one or more transmitters 34 and one or more receivers 36.

A disadvantage of the prior art architecture shown in FIG. 3 is that all of the Ethernet data packets are routed through the CPU 30. This unnecessarily loads the CPU 30, requiring a more powerful CPU 30 which is costly and has more power dissipation.

Another disadvantage of the prior art structure shown in FIG. 3 is that using a single MAC 32 results in defining the relationship or ratio between the number of receivers 36 and the number of transmitters 34 according to the specific MAC silicon that is used. This is not always the most efficient design because, depending on the application, often more transmitters are needed than are receivers, or vice versa.

These problems can be overcome with the present invention, a first embodiment of which is shown in FIG. 4. FIG. 4 shows a high-level block diagram of a CMTS 116 that may be located in a headend, primary hub (PH), secondary hub (SH), and fiber node (FN), as examples. An Ethernet connection 129 adapted to receive Ethernet data packets is coupled to a CPU 130. A single IC 142 includes a MAC 138 and one or more transmitters 134, and a separate, single IC 144 includes a MAC 140 and one or more receivers 136. CPU 130 is coupled to IC's 142 and 144, as shown. The MAC function 138/140 is partitioned so that MAC 138 of IC 142 is adapted to handle downstream information and the MAC 140 of IC 144 is adapted to handle upstream information.

The transmitter 134 (downstream) MAC 138 handles the transmitter data packets. The transmitter MAC 138 is adapted to encrypt packets, handle payload header suppression, and put the Ethernet packets inside an MPEG frame, for example. MAC functions 138/140 may have a few functions duplicated.

The receiver 136 (upstream) MAC 140 handles the transmitter data packets. The receiver MAC 140 function is more complicated and includes programming the receiver 136 according to map messages. When the time is mapped, the receiver 136 must be loaded with this map information to determine when each packet is entered. For each message or data packet that arrives, the receiver MAC 140 handles the data encryption and concatenation. The receiver MAC 140 is adapted to handle defragmentation, which is the rebuilding of packets that have been fragmented. The receiver MAC 140 is also adapted to handle deconcatenation, meaning that if the packet is large, the MAC 140 divides the packet into several smaller packets according to DOCSIS standards, for example. Receiver MAC 140 may also be adapted to suppress packet payload headers or to perform reverse payload header suppression, for example.

CMTS 116 may be adapted to handle DOCSIS data and video on demand, for example. The novel CMTS 116 having a split MAC 138/140 function allows more flexibility because when a cable network is used for the transmission of data packets, for example, many more receivers 136 are needed than transmitters 134. Alternatively, when video on demand (VOD) is used, many more transmitters 134 are required than receivers 134, for example. The novel scalable CMTS 116 allows for additional receivers 136 and transmitters 134 be added as required, because each receiver 136 has its own MAC 140 and each transmitter 134 has its own MAC 138. The split MAC 138/140 function between the upstream and downstream thus enables a CMTS designer to change the ratio of receivers 136 to transmitters 134.

FIG. 5 shows another preferred embodiment for a CMTS architecture 216. A fiber connection preferably comprising, for example, a 100BaseF 246 having a 100 Mbps physical layer interface connected to fiber is coupled to CPU 230. CPU 230 is coupled to IC 242. IC 242 includes one or more transmitters 234, for example, comprising a dual transmitter. IC 242 also includes a Base MAC 238, preferably comprising a transmitter MAC 138 as described for the CMTS 116 shown in FIG. 4. IC 242 is coupled to an up converter subsystem 250 that is adapted to up convert or move an analog signal up to a slot within the bandwidth of the communications network. Up converter 250 may be a part of the CMTS 216, or alternatively, up converter 250 may reside elsewhere, as shown in phantom at 251. Up converter 250 is coupled to an output of the CMTS 216.

CPU 230 is also coupled to IC 244. IC 244 includes one or more receivers 236 that may comprise, for example, a dual burst receiver. IC 244 also includes a base MAC 240, the MAC 240 preferably comprising a receiver MAC 138 as described for the CMTS 116 shown in FIG. 4. IC 244 is coupled to one or more analog-to-digital (A/D) converters 248 that are adapted to convert a received analog signal to a digital signal. Alternatively, A/D converter(s) 248 may be a part of IC 244, not shown. A/D converter(s) 248 is coupled to an input of the CMTS 216.

The CPU 230 is adapted to specify to each data packet which transmitter 234 to be sent to, for example, the CPU 230 may send a "0" to indicate the packet should be sent to transmitter 1, and the CPU 230 may send a "1" to indicate that the packet should be sent to transmitter 2 (not shown; however, dual transmitter 234 comprises transmitter 1 and 2.) Similarly, a bit may be used by the CPU 230 to indicate if a packet came from receiver 1 or from receiver 2 (not shown; however, dual receiver 236 comprises receiver 1 and 2.) Alternatively, two different queues may be used, with queue 1 for receiver 1 and queue 2 for receiver 2, and the same two-queue method may be used transmitters 1 and 2. More bits are used if more transmitters and receivers are used.

Having two or more transmitters 224 on a single chip 242 is beneficial in that a reduced number of chips are required 242. Furthermore, each transmitter 224 may have a separate output or a plurality of transmitters 224 may share the same output.

Referring to FIG. 6, shown is another preferred embodiment for a CMTS architecture 316 in accordance with the present invention. A fiber connection preferably comprising, for example, 100BaseF 346 comprising a 100 Mbps physical layer interface connected to fiber is coupled to a Layer 2 (L2) switch 352. L2 switch 352 is preferably an Ethernet switch adapted to read Layer 2 packets. Alternatively, L2 switch 352 may comprise a Layer 3 switch, not shown.

CPU 330 is coupled to L2 switch 352. L2 switch 352 is coupled to IC 342. IC 342 includes one or more transmitters 334 comprising, for example, a dual transmitter. IC 342 includes a Base MAC 338, preferably comprising a transmitter (downstream) MAC 138 as described for the CMTS 116 shown in FIG. 4. IC 342 is coupled to an up converter 350 that is adapted to up convert or move an analog signal up to a slot within the bandwidth of the communications network. Up converter 350 is coupled to an output of the CMTS 316.

L2 switch 352 is also coupled to IC 344. IC 344 includes one or more receivers 336 that may comprise a dual burst receiver, for example. IC 344 also includes a base MAC 340, the MAC 340 preferably comprising a receiver MAC 138 as described for the CMTS 116 shown in FIG. 4. IC 344 is coupled to an analog-to-digital (A/D) converter 348. A/D converter 348 is coupled to an input of the fiber node 316.

IC 344 is managed by a local CPU 330 or a remote CPU 331, shown in phantom. For example, if CMTS 316 is part of a fiber node, remote CPU 331 may be located in a secondary hub. Preferably, a DOCSIS MAP table for the transmitter(s) 334 is downloaded from the CPU 330/331.

IC 344 is adapted to operate in two modes: a DOCSIS minimal mode and a DOCSIS accelerate mode. In the DOCSIS minimal mode, each management message is encapsulated in an Ethernet frame and sent to the CPU 330/331. Each data message is divided to a data field that sends it as it is, and a header field that is handled as a management message. The DOCSIS minimal mode supports concatenation of data packets but no header suppression and fragmentation.

In the DOCSIS accelerate mode, digital encryption standard (DES) and cyclical redundancy code (CRC) functionality are handled using a service identification (SID) to DES table that is loaded by the CPU 330/331. The packets headers that do not include useful information are filtered. Statistics counters exist for the CPU 330/331 quality of service (QOS) management. Concatenation, fragmentation and header suppression are supported in this mode.

IC 352 is managed by local CPU 330 or remote CPU 331 shown in phantom, using a proprietary Ethernet protocol, for example. IC 352 is adapted to operate in two modes: a Moving Picture Experts Group (MPEG) over IP mode, and a DOCSIS mode. In the MPEG over IP mode, the IC 352 de-encapsulates the MPEG frames, and sends them in the proprietary timing and order. In the DOCSIS mode, DES and CRC functionality is handled by the IC 352 using a MAC address, such as SID, DES, number of transmitter table that is loaded by the CPU 330/331. A special command to handle synchronization exists, and the IC 352 may have seven or more priority queues, using type of service, (TOS) for example. Header suppression may be supported in the DOCSIS mode.

For DOCSIS minimal mode, the CPU 330/331 is adapted to add for each data packet the buffer descriptor, and put it in the right queue. The buffer descriptor contains information, such as to which transmitter 334 the packet should go, what is the encryption, and what is the key for the encryption. In addition, the CPU 330/331 is adapted to add management packets to the data packets.

In the upstream direction, CPU 330/331 is adapted to analyze the data packets, and to delete the management part to separate the management part from the data part of the packets, for Layer 2 data packets.

An advantage of the CMTS 316 architecture shown is that the CPU 330/331 is not required to be local. The remote CPU 331 may be placed in a headend or secondary hub, and the remainder of the components may be placed in a fiber node 316. Alternatively, when the architecture 316 is used for a headend, which is contemplated with the present invention, this enables the CPU 331 to be separate headend 316.

Because dual transmitters 334 and receivers 336 are used, each having a separate MAC function 338/340 respectively, the architecture is scalable. Any ratio between receivers 336 to transmitters 334 can be achieved because every receiver 336 comes with its own associated MAC 340, and every transmitter 334 comes with its own associated MAC 338.

Because the architecture is based on a Layer 2 switch, it therefore has very low costs and an unlimited capacity.

Another feature of the architecture shown in FIG. 6 is that the data packets are not transferred through the CPU 330/331. The data packets go directly from the 100BaseF, the external Ethernet port 346, to the transmitter 334 in the downstream without any CPU 330/331 interference. In the upstream direction, the CMTS 316 sends data packets directly from the receiver 336 to the 100BaseF 346, without any interference from the CPU 330/331. This is accomplished by the L2 switch 352 examining the address and routing the packets to the appropriate place. If control or management information is included in the packet, the address would be the CPU 330/331 address. The L2 switch 352 transfers the management packet to the CPU 330/331, which causes appropriate action to be taken. If the packet is a data packet, the packet is sent directly to the appropriate IC 342/344, e.g. the transmitter 334 or receiver 336. The dual receiver and dual transmitter may be adapted to have counters to include more functionality, to add more efficient management of the CPU 330/331.

An alternative configuration of the CMTS architecture shown in FIG. 6 is to couple the CPU 330 directly to IC 344 and to IC 342, not shown, for example, via a PCI interface. This will simplify the management of IC's 342 and 344 because the chip management is not required to be encapsulated in Ethernet packets.

Figure 7:
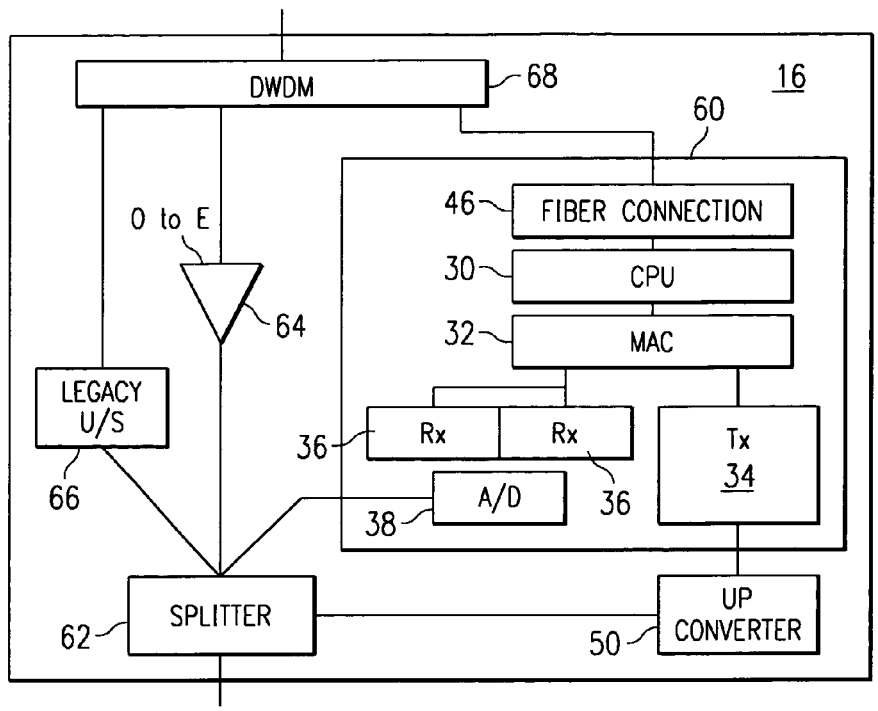
FIG. 7 illustrates a prior art fiber node architecture.
Figure 8:
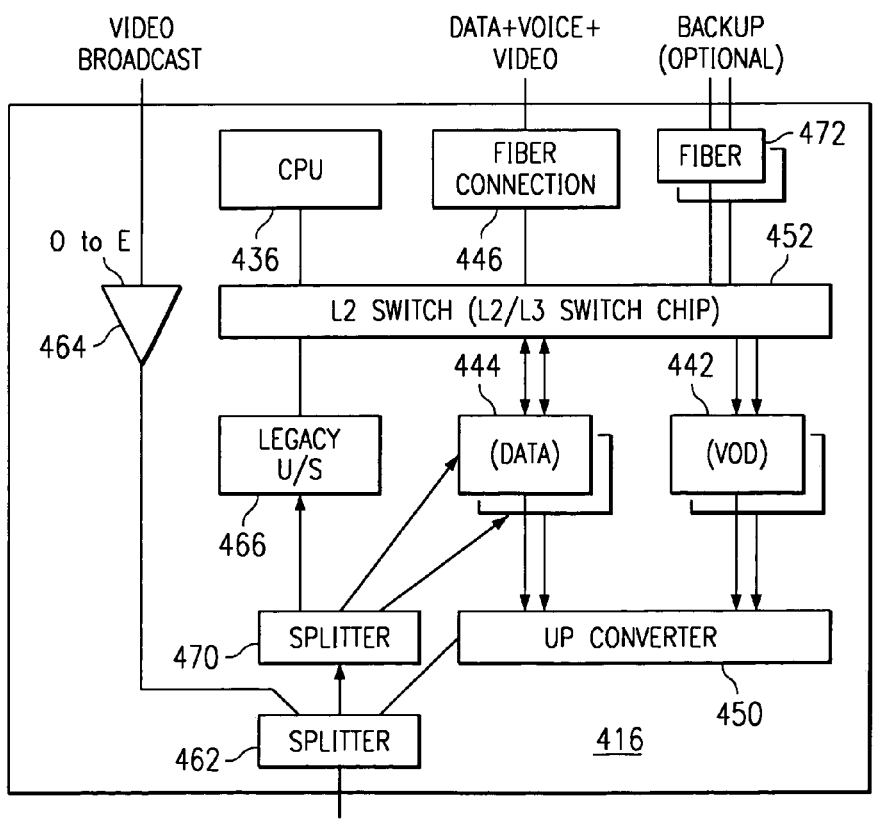
FIG. 8 shows an implementation of the present invention.

Next, a prior art fiber node architecture 16 shown in FIG. 7 will be compared to a fiber node architecture 416 of the present invention shown in FIG. 8. FIG. 7 shows a prior art fiber node 16 architecture having a mini-CMTS 60 including a fiber connection 46 coupled to a CPU 30 which is coupled to a MAC 32. MAC 32 is coupled to receivers 36 and transmitter 34. Receivers 36 are coupled to an A/D converter 48. The mini CMTS 60 transmitter 34 is coupled to up converter 50 which is coupled to splitter 62. A legacy upstream function 66 and an optical to electrical (O to E) converter 64 are coupled to the splitter 62. An optional dense wave division modulator (DWDM) 68 may be coupled to the mini CMTS 60, the O to E converter 64, and the legacy upstream function 66. In the prior art fiber node 16, each element within the mini CMTS 60 comprises a separate integrated circuit.

A fiber node architecture 416 in accordance with the present invention is shown in FIG. 8. In this architecture, the MAC function is included in IC's 442 and 444. IC's 442 and 444 are coupled to an up converter 450. Up converter 450 is coupled to splitter 462. The splitter 462 is coupled to splitter 470 which is coupled to a legacy upstream function 460 and IC 444. The splitter 462 is coupled to 0 to E converter 464, which input is coupled to the video broadcast input of the fiber node 416. The data/voice/video input of the fiber node 416 is coupled to a fiber connection 446 which is coupled to an L2 switch 452. L2 switch 452 preferably comprises an L2/L3 switch chip or IC, and is coupled to legacy upstream function 466, IC 444, and IC 442. An L3 switch preferably comprises an Ethernet switch adapted to read layer 2 Ethernet packets and layer 3 information from IP headers, for example. IC 444 processes the data for the data, voice and video input to the fiber node 416, and IC 442 processes the video on demand (VOD) information. An optional backup is input to the fiber node 416 through fiber 472. CPU 430 is coupled to L2 switch 452 as shown.

The novel circuit and method disclosed herein achieves technical advantages by providing a reconfigured MAC function contained in a receiver IC 226 and 336 and a transmitter IC 234 and 334. This is advantageous because costs of a CMTS are reduced by providing flexibility in capacity levels with two MAC IC's, rather than providing the maximum capacity level as in single MAC ICs of the prior art. A further advantage is providing more modularity and scalability to the CMTS. Another advantage is separating the MAC control of video on demand from DOCSIS signals to enable transmission of them at the same time. Data packets bypass the CPU 330/331 in an embodiment, increasing the speed and efficiency of the system.

Although the invention is described herein for use with signals via fiber-optic and coaxial cables in a cable TV environment, it is anticipated that the present invention is effective in other data transmission devices and systems such as telephony, wireless and satellite applications, as examples. The split MAC functions described herein for use with a CMTS may also be implemented in other communications devices, for example.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication device for a cable communications network, the communication device comprising: a first integrated circuit (IC) including one or more receivers and a first media access control (MAC) function, said first MAC function handling defragmentation, deconcatenation, suppressing packet payload headers, and performing reverse payload header suppression; and a second IC including one or more transmitters and a second MAC function, said second MAC function encrypting packets, handling payload header suppression, and putting Ethernet packets inside a MPEG frame, wherein the first and second IC's are coupleable to a communications network for controlling downstream and upstream communications, respectively.

2. The communication device according to claim 1, further comprising:
an analog to digital (A/D) converter coupled to an input of the first IC; and
an up converter coupled to an output of the second IC.

3. The communication device according to claim 2, further comprising:
an L2/L3 switch coupled to the first and second IC's;
a fiber connection coupled to the L2/L3 switch; and
a central processing unit (CPU) coupled to the L2/L3 switch, wherein data packets may be transferred from the L2/L3 switch to either the first IC or second IC without going through the CPU.

4. The communication device according to claim 3, wherein the CPU is adapted to download a table containing instructions for routing the data packets.

5. The communication device according to claim 1, further comprising:
a central processing unit (CPU) coupled to the first and second IC's; and
a fiber connection coupled to the CPU.

6. The communication device according to claim 5 wherein the CPU is remote from the communication device.

7. The communication device according to claim 1 wherein a few of the first and second MAC functions are the same.

8. The communication device according to claim 1 wherein the device is part of a fiber node, a headend, a secondary hub, or a primary hub of a cable network.

9. A communication device comprising: a fiber interface; an L2/L3 switch coupled to the fiber interface; a central processing unit (CPU) coupled to the L2/L3 switch; one or more transmitters coupled to the L2/L3 switch; and one or more receivers coupled to the L2/L3 switch; a first media access control (MAC) function coupled to the receiver, said first MAC function handling defragmentation, deconcatenation, suppressing packet payload headers, and performing reverse payload header suppression; and a second MAC function, said second MAC function encrypting packets, handling payload header suppression, and putting Ethernet packets inside a MPEG frame coupled to the transmitter.

10. The communication device according to claim 9 wherein data packets received at the fiber interface are provided to the transmitters without being read by the CPU.

11. The communication device according to claim 9 wherein data packets received at the fiber interface are provided to the receivers without being read by the CPU.

12. The communication device according to claim 9 wherein the CPU is remote from the communication device.

13. The communication device according to claim 9 wherein the CPU is adapted to download a table containing instructions for routing data packets.

14. A data transmission device for a cable network, comprising: a plurality of first means for receiving data signals and controlling the receipt thereof with a corresponding first media access control (MAC) function, said first MAC function handling defragmentation, deconcatenation, suppressing packet payload headers, and performing reverse payload header suppression; and a plurality of second means for transmitting data signals and controlling the receipt thereof with a corresponding second MAC function, said second MAC function encrypting packets, handling payload header suppression, and putting Ethernet packets inside a MPEG frame, wherein the data transmission device is coupleable to a communications network for controlling downstream and upstream communications with the plurality of first means and second means, respectively.

15. The communication device according claim 14 wherein a few of the first and second MAC functions are the same.

16. A method of controlling the receipt and transmission of data in a communications network, comprising: receiving data signals and controlling the receipt thereof with a first media access control (MAC) function, said first MAC function handling defragmentation, deconcatenation, packet payload header suppression, and reverse payload header suppression of the data packets; and transmitting data signals and controlling transmission thereof with a second MAC function, said second MAC function encrypting packets, handling payload header suppression, and putting Ethernet packets inside a MPEG frame, wherein the first and second MAC functions reside in two separate integrated circuits (ICs).

17. The method according to claim 16 wherein the receiving and controlling is of downstream communications.

18. The method according to claim 16 wherein the transmitting and controlling is of upstream communications.

19. The method according to claim 16 wherein the method is accomplished by a fiber node, headend, primary hub or secondary hub of a cable network.

20. The method according to claim 19 wherein the communications network includes an L2/L3 switch and a central processing unit (CPU) coupled to the first and second MAC functions, wherein data packets may be transferred from the L2/L3 switch to either the first MAC function or second MAC function without going through the CPU.

21. The method according to claim 20 further comprising:
downloading a table containing instructions for routing the data packets.

* * * * *